United States Patent

[11] 3,615,773

[72] Inventors Serafima Petrovna Obidina
  Gogolevsky bulvar, 25, kv. 13;
  Alexandra Nikolaevna Bush, Zelenograd,
  Korpus 352, kv. 51, both of Moscow,
  U.S.S.R.
[21] Appl. No. 857,578
[22] Filed Sept. 12, 1969
[45] Patented Oct. 26, 1971

[54] GLASS FOR MANUFACTURE OF GLASS-COATED MICROWIRE
  1 Claim, No Drawings
[52] U.S. Cl. .................................................. 106/54,
  72/42, 106/48, 117/231, 161/196
[51] Int. Cl. ........................................................ C03c 3/08,
  C32b 3/08
[50] Field of Search .......................................... 72/42;
  106/54, 50, 48; 117/129, 231; 161/196

[56] References Cited
UNITED STATES PATENTS

| | | | |
|---|---|---|---|
| 2,538,917 | 1/1951 | Sejournet et al. .............. | 72/42 |
| 3,458,344 | 7/1969 | Little et al. .................... | 106/54 |

FOREIGN PATENTS

| | | | |
|---|---|---|---|
| 186,660 | 1966 | U.S.S.R. ......................... | |

OTHER REFERENCES

Taylor " A Method of Drawing Metallic Filaments" – Phys. Rev. 23 (1924) pp. 655– 660 QC1 p4

*Primary Examiner*—Helen M. McCarthy
*Attorney*—Waters, Roditi, Schwartz & Nissen

ABSTRACT: Glass for manufacturing by the casting technique glass-coated, continuous filament microwire from metals and alloys having a melting point above 1,450° C., for example, from nickel, palladium, nichrome, etc., which contains, apart from $SiO_2$, $B_2O_3$, BaO, $K_2O$ and $Li_2O$, also $P_2O_5$ present to the extent of 0.5–0.7 percent by weight of all the glass components.

GLASS FOR MANUFACTURE OF GLASS-COATED MICROWIRE

This invention relates to glass intended for the manufacture of glass-coated microwire by the casting technique.

There is known a glass for the manufacture of glass-coated microwire by the casting technique, the composition of this known glass being as follows, weight percent:

| | |
|---|---|
| $SiO_2$ | 75–79 |
| $B_2O_3$ | 17–19 |
| BaO | 1.5–2.5 |
| $K_2O$ | 0.7–1.7 |
| $Li_2O$ | 0.2–0.8 |

(cf, The USSR Author's Certificate No. 186,660, cl. 32b, 3/08)

The glass having the aforespecified composition is suitable exclusively for the manufacture of glass-coated microwire from metals whose melting point lies in the 1,350°–1,450° C. range, e.g., nichrome, and is inapplicable where it is desired to manufacture microwire from metals having a melting point above 1,450° C., e.g., nickel, palladium, cobalt-base alloys, etc.

Moreover, the employment of the known glass for the manufacture of nichrome microwires does not make it possible to obtain a continuous thread, the wire length being generally not greater than 1 m.

It is an object of the present invention to eliminate the aforementioned disadvantages.

It is a further and more specific object of the present invention to provide a glass which will make it possible to manufacture glass-coated, continuous filament microwire from metals and alloys having a melting point above 1,450° C., e.g., from nickel, nichrome, palladium, cobalt-base alloys, etc., by the casting technique.

These objects have been accomplished by the provision of glass for the manufacture of glass-coated microwire having the following composition, weight percent:

| | |
|---|---|
| $SiO_2$ | 79.0–83.0 |
| $B_2O_3$ | 14.0–16.0 |
| BaO | 1.5–2.5 |
| $K_2O$ | 0.7–1.7 |
| $Li_2O$ | 0.3–0.7 |
| $P_2O_5$ | 0.5–0.7 |

The present invention is illustrated hereinbelow by the description of an exemplary procedure for producing glass to be used for the manufacture of glass-coated microwire.

The glass was melted in a gas-fired and electrically heated batch furnace, the composition of the charge being as follows (weight percent per ton of glass melt):

| | |
|---|---|
| quartz sand | 68.5 |
| boric acid | 25.3 |
| barium carbonate | 1.1 |
| barium chloride | 1.4 |
| potassium nitrate | 2.3 |
| lithium hydroxide | 0.8 |
| ammonium phosphate | 0.7 |

Maximum temperature of glass melting equals 1,600°–1,620° C.

Tubes from 8 to 18 mm. in diameter were drawn from the glass melt at a temperature of 1,500°–1,520° C.

The resultant glass has the following analysis, weight percent:

| | |
|---|---|
| $SiO_2$ | 80.5 |
| $B_2O_3$ | 15.2 |
| BaO | 2.0 |
| $K_2O$ | 1.2 |
| $Li_2O$ | 0.5 |
| $P_2O_5$ | 0.6 |

The glass of the present invention is characterized by the following physical and chemical properties:

| | |
|---|---|
| Coefficient of linear thermal expansion on the 20°–300a$L$. C. range | $26.0 \times 10^{17}$ 1/deg. |
| Softening point | 660° C. |
| Thermal stability | 300° C. |
| Temperature at which volume resistivity equals $10^9$ Mohm | 400° C. |
| Temperature at which glass viscosity equals $10^3$ poises | 1,500° C. |
| Chemical stability | Class I of hydrolytic stability |
| Upper crystallization limit | 1,450° C. |

Glass tubes are closed at one end and charged with a small quantity of a metal, such as nickel (m.p. 1,450° C.), whereupon the tubes are placed in an induction furnace. High frequency currents cause the nickel charge to melt and heat the glass until its viscosity equals $10^3$–$10^{3.6}$ poises, so that a glass capillary can be readily drawn.

Incorporation of $P_2O_5$ into the composition of the present glass provides for good wettability of the glass with the metal and results in filling the capillary being drawn with the molten metal and forming a microwire which is continuously wound onto a rotating spool.

In the course of being drawn, the microwire is passed through a crystallizer which makes for microwire diameter constancy.

We claim:

1. Glass for the manufacture of glass-coated microwire which has the following analysis, weight percent:

| | |
|---|---|
| $SiO_2$ | 79.0–83.0 |
| $B_2O_3$ | 14.0–16.0 |
| BaO | 1.5–2.5 |
| $K_2O$ | 0.7–1.7 |
| $Li_2O$ | 0.3–0.7 |
| $P_2O_5$ | 0.5–0.7 |

* * * * *